United States Patent Office 3,792,170
Patented Feb. 12, 1974

3,792,170
NOVEL ALKYLSULFINYL DERIVATIVES FOR
PAIN, FEVER AND INFLAMMATION
Tsung-Ying Shen and Bruce E. Witzel, Westfield, N.J.,
assignors to Merck & Co., Inc., Rahway, N.J.
No Drawing. Filed Mar. 14, 1972, Ser. No. 234,659
Int. Cl. A61k 27/00
U.S. Cl. 424—303        14 Claims

ABSTRACT OF THE DISCLOSURE

Novel alkylsulfinyl derivatives which find use as anti-inflammatory, analgestic and antipyretic agents.

This invention relates to a novel class of compounds.

This invention further relates to a novel class of compounds useful in treating inflammation in its varying manifestations. In addition, these novel compounds exhibit potent analgesic and antipyretic activity and, therefore, this invention also relates to analgesic and antipyretic methods and compositions. More particularly, this invention is concerned with novel alkylsulfinyl derivatives for use in the treatment of inflammation and associated pain and fever. Furthermore, this invention is directed to analgesic and antipyretic methods for the relief and treatment of pain and fever not symptomatically related to an inflammatory indication and compositions utilized therefore.

The novel alkylsulfinyl derivatives employed in the treatment of a condition symptomatically evidenced by pain, fever and inflammation, either as an essential or concomitant phenomena of the condition are represented by the following formula:

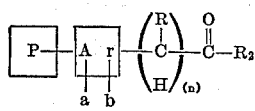

and pharmaceutically acceptable addition salts, wherein:

R=H or lower alkyl (e.g. methyl, ethyl, propyl, butyl, etc.);
$R_2$=hydroxy, amino, lower alkoxy (such as methoxy, ethoxy, butoxy, pentoxy, and the like), lower alkylamino (methylamino, propylamino, pentylamino, and the like), di(lower alkyl)amino (dimethylamino, dibutylamino, propylpentylamino, and the like), diloweralkylamino loweralkylamino, diloweralkylaminoloweralkoxy, hydroxyloweralkoxy, (3-hydroxypropoxy, 2-hydroxypropoxy, 4-hydroxybutoxy and the like), polyhydroxyloweralkoxy (2,3-dihydroxypropoxy, 2,3,4,5,6-pentahydroxyhexyloxy and the like), loweralkoxyloweralkoxy (ethoxyethoxy), phenyl-loweralkoxy (benzyloxy, phenethoxy and the like), phenoxy, substituted phenoxy (such as loweralkoxy, diloweralkylamino, loweralkanoylamino, carboxy and carboloweralkoxy, loweralkanoylamino-lower-alkoxy, hydrazino, (hydroxylamino), N-morpholino, N-(4-lower-alkyl-piperindino), N-[4-(hydroxyloweralkyl)-piperidino], (hydroxyloweralkyl)amino and a naturally occurring amino acid radical with attachment at the N, such as glycine, phenylalanine, proline, methionine and taurine;
(n) is the integer one or two;

P is

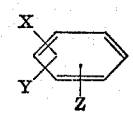

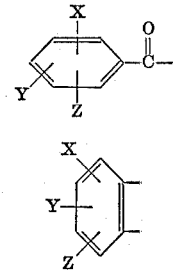

wherein

X is H or loweralkylsulfinyl (methylsulfinyl, ethylsulfinyl, propylsulfinyl, butylsulfinyl, etc.);
Y is H; Halogen (Cl, F, Br. I, etc.) loweralkylthio (methylthio, ethylthio, propylthio, butylthio, pentylthio, etc.), loweralkylsulfinyl (methylsulfinyl, ethylsulfinyl, propylsulfinyl, butylsulfinyl, etc.), loweralkylsulfonyl (methylsulfonyl, ethylsulfonyl, propylsulfonyl, pentylsulfonyl, etc.) cyano haloalkyl (e.g., trifluoromethyl), carboxy, carboalkoxy (carbomethoxy, carboethoxy, carbopropoxy, etc.), OH, loweralkoxy (e.g., methoxy, ethoxy, propoxy, butoxy, pentoxy, etc.), loweralkyl (e.g., methyl, ethyl, propyl, butyl, pentyl, etc.), amino, loweralkylamino (e.g., methylamino, ethylamino, propylamino, butylamino, etc.), diloweralkylamino (e.g., dimethylamino, methylethylamino, methylbutylamino, etc.), sulfo, sulfonamido, acyl (e.g., formyl, acetyl, propionyl, butryl, benzoyl, etc.), haloloweralkylsulfinyl (e.g., difluoromethylsulfinyl, etc.), alkyloxyalkylthio (e.g., methoxymethylthio, ethoxypropylthio, ethoxybutylthio, etc.), loweralkyloxyloweralkylsulfinyl (e.g., methoxymethylsulfinyl, ethoxypropylsulfinyl, propoxymethylsulfinyl, etc.);
Z=H, halogen (Br, Cl, F, I, etc.), haloalkyl (e.g. 2-fluoroethyl, etc.), loweralkoxy (methoxy, ethoxy, propoxy, etc.), amino, loweralkylamino, diloweralkylamino, diloweralkylaminoloweralkylamino, diloweralkylaminoloweralkoxy;

Ar is phenyl or heteroaryl

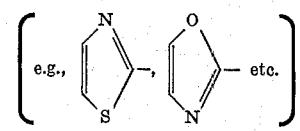

"a" is H or loweralkylsulfinyl (e.g., methylsulfinyl, ethylsulfinyl, propylsulfinyl, butylsulfinyl, pentasulfinyl, etc.);
"b" is H, OH, lower alkoxy (e.g., methoxy, ethoxy, propoxy, butoxy, pentoxy, etc.), amino, loweralkylamino (e.g., methylamino, ethylamino, propylamino, butylamino, pentylamino, etc.), diloweralkylamino (e.g., dimethylamino, methylethylamino, methylpropylamino, ethylbutylamino, etc.), loweralkylsulfinyl (e.g., methylsulfinyl, ethylsulfinyl, etc.), halogen (Cl, F, Br, I, etc.), cyano, phenyl or substituted phenyl wherein the substitutent is "Y" above;
wherein at least one of X, or "a" must be loweralkylsufinyl.

It should be noted that in addition to the free acids, encompassed within the scope of the invention are the corresponding esters, amides and pharmaceutically acceptable addition salts.

The term "pharmaceutically acceptable addition salts" signifies those salts derived from pharmacologically acceptable inorganic and organic bases. Suitable salts include those of alkali metals such as sodium, potassium or lithium, those of alkaline earth metals such as magnesium and calcium, ammonium and salts of organic amines such as ethylamine, triethylamine, ethanolamine, diethanolamine, diethylaminoethanol, ethylenediamine, benzylamine, procaine, pyrrolidine, piperidine, morpholine, 1-ethyl-piperindine, 2-piperidine ethanol and the like.

In its preferred aspects this invention relates to compounds having the following formulae:

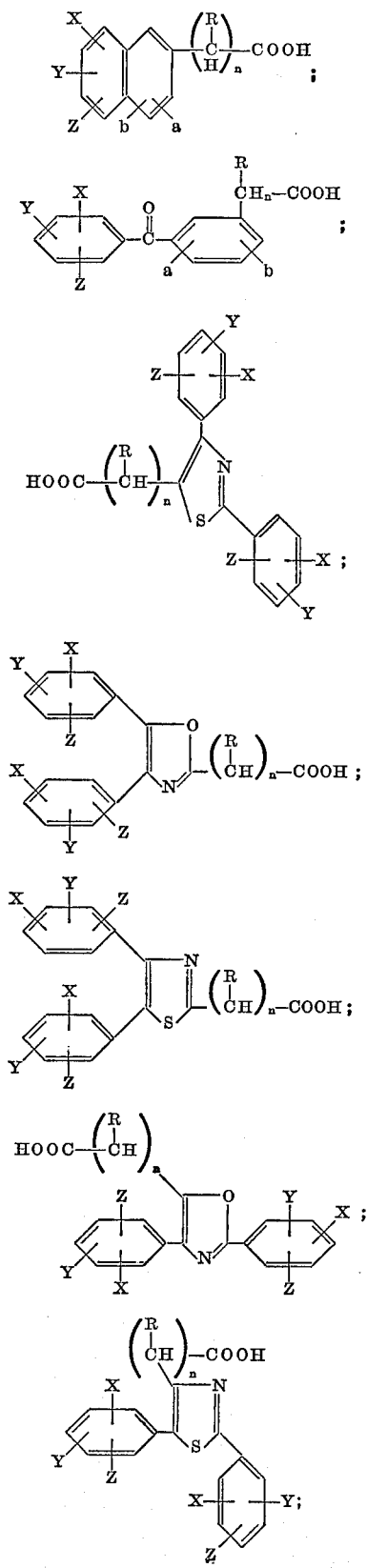

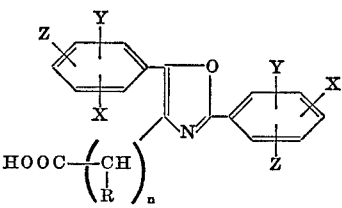

wherein X, Y, Z, $a$, $b$ and R are as set forth above.

Representative of the alkylsulfinyl derivatives within the scope of the invention are included in the following:

2-(6-methylsulfinyl-2-naphthyl)-propionic acid,
6-methylsulfinyl-2-naphthyl-acetic acid,
2-(3-methylsulfinyl-2-naphthyl)-propionic acid,
2-(4-methylsulfinyl-2-naphthyl)-propionic acid,
2-(5-methylsulfinyl-2-naphthyl)-propionic acid,
2-(7-methylsulfinyl-2-naphthyl)-propionic acid,
2-(8-methylsulfinyl-2-naphthyl)-propionic acid,
3-(6-methylsulfinyl-2-naphthyl)-propionic acid,
2-(3-fluoro-6-methylsulfinyl-2-naphthyl)-propionic acid,
2-(4-chloro-6-methylsulfinyl-2-naphthyl)-propionic acid,
2-(6-methoxy-7-methylsulfinyl-2-naphthyl)-propionic acid,
2-(3-methoxy-6-methylsulfinyl-2-naphthyl)-propionic acid,
2-(6-methoxy-4-methylsulfinyl-2-naphthyl)-propionic acid,
2-(4-fluoro-6-methylsulfinyl-2-naphthyl)-propionic acid,
2-(7-fluoro-6-methylsulfinyl-2-naphthyl)-propionic acid,
2-(1-fluoro-6-methylsulfinyl-2-naphthyl)-propionic acid,
2-(6-methylsulfinyl-4-trifluoromethyl-2-naphthyl)-propionic acid,
2-(8-chloro-6-methylsulfinyl-2-naphthyl)-propionic acid,
2[3,6-bis(methylsulfinyl)-2-naphthyl]-propionic acid,
2-(3-dimethylamino-6-methylsulfinyl-2-naphthyl)-propionic acid,
2-(6-methoxyethylsulfinyl-2-naphthyl)-propionic acid,
2-(6-difluoromethylsulfinyl-2-naphthyl)-propionic acid,
2-(4-cyano-6-methylsulfinyl-2-naphthyl)-propionic acid,
2-(3-methyl-6-methylsulfinyl-2-naphthyl)-propionic acid,
2-(7-methyl-6-methylsulfinyl-2-naphthyl)-propionic acid,
2-(3-hydroxy-6-methylsulfinyl-2-naphthyl)-propionic acid,
2-(6-methylsulfinyl-4-methylsulfonyl-2-naphthyl)-propionic acid,
2-(6-fluoro-3-methylsulfinyl-2-naphthyl)-propionic acid,
2-(6-amino-3-methylsulfinyl-2-naphthyl)-propionic acid,
2-(4-acetyl-6-methylsulfinyl-2-naphthyl)-propionic acid,
3-[(4-methylsulfinyl)-benzoyl]-phenylacetic acid,
2-[3-[(4-methylsulfinyl)-benzoyl]-phenyl]-propionic acid,
3-[3-[(4-methylsulfinyl)-benzoyl]-phenyl]-propionic acid,
2-[3-[(3-methylsulfinyl)-benzoyl]-phenyl]-propionic acid,
2-[3-[(2-methylsulfinyl)-benzoyl]-phenyl]-propionic acid,
2-[2-methoxy-3-[(4-methylsulfinyl)benzoyl]phenyl]-propionic acid,
2-[2-fluoro-3-[(4-methylsulfinyl)benzoyl]-phenyl]-propionic acid, 2-[4-chloro-3-[(4-methylsulfinyl)benzoyl]-phenyl]-propionic acid,
2-[5-chloro-3-[(4-methylsulfinyl)benzoyl]-phenyl]-propionic acid,
2-[6-fluoro-3-[(4-methylsulfinyl)-benzoyl]-phenyl]-propionic acid,
2-[4-methylsulfinyl-3-[(4-methylsulfinyl)-benzoyl]-phenyl]-propionic acid,
2-[3-[(4-fluorobenzoyl)-4-methylsulfinyl]-phenyl]-propionic acid,
2-[3-[(2-chloro-4-methylsulfinyl)benzoyl]-phenyl]-propionic acid,
2-[4-fluoro-3-[(4-methylsulfinyl)benzoyl]-phenyl]-propionic acid,
6-methyl-3-[(4-methylsulfinyl)benzoyl]-phenylacetic acid,
4-chloro-3-[(4-methylsulfinyl)-benzoyl]-phenylacetic acid,
3-[4-chlorobenzoyl]-5-methylsulfinylphenylacetic acid,
3-[(4-dimethylamino)benzoyl]-4-methylsulfinyl-phenylacetic acid,
2-hydroxy-3-(4-methylsulfinylbenzoyl)-phenylacetic acid,
3-[(4-methylsulfinyl)benzoyl]-4-(trifluoromethyl)-phenylacetic acid,
3-[(4-methylsulfinyl)benzoyl]-4-(methylthio)-phenylacetic acid,
6-ethoxy-3-[(4-methylsulfinyl)benzoyl]-phenylacetic acid,
6-amino-3-[(4-methylsulfinyl)benzoyl]-phenylacetic acid,
3-benzoyl-2-methylsulfinylphenylacetic acid,
3-benzoyl-4-methylsulfinylphenylacetic acid,
3-benzoyl-5-methylsulfinylphenylacetic acid,
3-benzoyl-6-methylsulfinylphenylacetic acid,
2-[3-benzoyl-4-methylsulfinylphenyl]-propionic acid,
2-[3-benzoyl-5-methylsulfinylphenyl]-propionic acid,
2-(4'-chlorophenyl)-4-(4'-methylsulfinylphenyl)-thiazol-5-yl acetic acid,
2-(4'-methylsulfinylphenyl)-4-(4'-chlorophenyl-thiazol-5-yl-acetic acid,
2-[2-(4'-chlorophenyl)-4-(4'-methylsulfinylphenyl)-thiazol-5-yl]-propionic acid,
2-[2-(4'-methylsulfinylphenyl)-4-(4'-chlorophenyl)-thiazol-5-yl]-propionic acid,
2-(4'-fluorophenyl)-4-(4'-methylsulfinylphenyl)-thiazol-5-yl-acetic acid,
2-(4'-methylsulfinylphenyl)-4-(4'-fluorophenyl)-thiazol-5-yl-acetic acid,
2-[2-(4'-fluorophenyl)-4-(4'-methylsulfinylphenyl)-thiazol-5-yl]-propionic acid,
2-[2-(4'-methylsulfinylphenyl)-4-(4'-fluorophenyl)-thiazol-5-yl]-propionic acid,
2-(4'-methoxyphenyl)-4-(4'-methylsulfinylphenyl)-thiazol-5-yl-acetic acid,
2-(4'-methylsulfinylphenyl)-4-(4'-methoxyphenyl)-thiazol-5-yl-acetic acid,
2-[2-(4'-methoxyphenyl)-4-(4'-methylsulfinylphenyl)-thiazol-5-yl]-propionic acid,
2-[2-(4'-methylsulfinylphenyl)-4-(4'-methoxyphenyl)-thiazol-5-yl]-propionic acid,
2-(4'-trifluoromethylphenyl)-4-(4'-methylsulfinylphenyl)-thiazol-5-yl-acetic acid,
2-(4'-methylsulfinylphenyl)-4-(4'-trifluoromethylphenyl)-thiazol-5-yl-acetic acid,
2-[2-(4'-trifluoromethylphenyl)-4-(4'-methylsulfinylphenyl)-thiazol-5-yl]-propionic acid,
2-[2-(4'-methylsulfinylphenyl)-4-(4'-trifluoromethylphenyl)-thiazol-5-yl]-propionic acid,
2-(4'-methylphenyl)-4-(4'-methylsulfinylphenyl)-thiazol-5-yl-acetic acid,
2-(4'-methylsulfinylphenyl)-4-(4'-methylphenyl)-thiazol-5-yl-acetic acid,
2-[2-(4'-methylphenyl)-4-(4'-methylsulfinylphenyl)-thiazol-5-yl]-propionic acid,
2-[2-(4'-methylsulfinylphenyl)-4-(4'-methylphenyl)-thiazol-5-yl]-propionic acid,
2-(4'-dimethylaminophenyl)-4-(4'-methylsulfinylphenyl)-thiazol-5-yl-acetic acid,
2-(4'-methylsulfinylphenyl)-4-(4'-dimethylaminophenyl)-thiazol-5-yl-acetic acid,
2-[2-(4'-dimethylaminophenyl)-4-(4'-methylsulfinylphenyl)-thiazol-5-yl]-propionic acid,
2-[2-(4'-methylsulfinylphenyl)-4-(4'-dimethylaminophenyl)-thiazol-5-yl]-propionic acid,
2-(4'-methylthiophenyl)-4-(4'-methylsulfinylphenyl)-thiazol-5-yl-acetic acid,
2-(4'-methylsulfinylphenyl)-4-(4'-methylthiophenyl)-thiazol-5-yl-acetic acid,
2-[2-(4'-methylthiophenyl)-4-(4'-methylsulfinylphenyl)-thiazol-5-yl]-propionic acid,
2-[2-(4'-methylsulfinylphenyl)-4-(4'-methylthiophenyl)-thiazol-5-yl]-propionic acid,
2-(4'-methylsulfinylphenyl)-4-(3'-methoxyphenyl)-thiazol-5-yl-acetic acid,
2-(3'-hydroxyphenyl)-4-(4'-methylsulfinylphenyl)-thiazol-5-yl-acetic acid,
2-phenyl-4-(4'-methylsulfinylphenyl)-thiazol-5-yl-acetic acid,
2-(4'-chlorophenyl-4-(3'-methylsulfinylphenyl)-thiazol-5-yl-acetic acid,
2-(2'-fluorophenyl)-4-(4'-methylsulfinylphenyl)-thiazol-5-yl-acetic acid,
2-[2-(2'-fluorophenyl)-4-(4'-methylsulfinylphenyl)-thiazol-5-yl]-propionic acid,
2-(4'-methylsulfinylphenyl)-4-(2'-fluorophenyl)-thiazol-5-yl-acetic acid,
2-[2-(4'-methylsulfinylphenyl)-4-(2'-fluorophenyl)-thiazol-5-yl]-propionic acid,
3-[4-(4'-methylsulfinylphenyl)-5-(4'-chlorophenyl)-oxazol-2-yl]-propionic acid,
3-[4-(4'-chlorophenyl)-5-(4'-methylsulfinylphenyl)-oxazol-2-yl]-propionic acid,
2-[4-(4'-methylsulfinylphenyl)-5-(4'-chlorophenyl)-oxazol-2-yl]-propionic acid,
2-[4-(4'-chlorophenyl)-5-(4'-methylsulfinylphenyl)-oxazol-2-yl]-propionic acid,
4-(4'-methylsulfinylphenyl)-5-(4'-chlorophenyl)-oxazol-2-yl-acetic acid,
4-(4'-chlorophenyl)-5-(4'-methylsulfinylphenyl)-oxazol-2-yl-acetic acid,
3-[4-(4'-methylsulfinylphenyl)-5-(4'-fluorophenyl)-oxazol-2-yl]-propionic acid,
3-[4-(4'-fluorophenyl)-5-(4'-methylsulfinylphenyl)-oxazol-2-yl]-propionic acid,
2-[4-(4'-methylsulfinylphenyl)-5-(4'-fluorophenyl)-oxazol-2-yl]-propionic acid,
2-[4-(4'-fluorophenyl)-5-(4'-methylsulfinylphenyl)-oxazol-2-yl]-propionic acid,
4-(4'-methylsulfinylphenyl)-5-(4'-fluorophenyl)-oxazol-2-yl-acetic acid,
4-(4'-fluorophenyl)-5-(4'-methylsulfinylphenyl)-oxazol-2-yl-acetic acid,
3-[4-(4'-methylsulfinylphenyl)-5-(4'-methoxyphenyl)-oxazol-2-yl]-propionic acid,
3-[4-(4'-methoxyphenyl)-5-(4'-methylsulfinylphenyl)-oxazol-2-yl]-propionic acid,
2-[4-(4'-methylsulfinylphenyl)-5-(4'-methoxyphenyl)-oxazol-2-yl]-propionic acid,
2-[4-(4'-methoxyphenyl)-5-(4'-methylsulfinylphenyl)-oxazol-2-yl]-propionic acid,
4-(4'-methylsulfinylphenyl)-5-(4'-methoxyphenyl)-oxazol-2-yl-acetic acid,
4-(4'-methoxyphenyl)-5-(4'-methylsulfinylphenyl)-oxazol-2-yl-acetic acid,
3-[4-(4'-methylsulfinylphenyl)-5-4'-dimethylaminophenyl)-oxazol-2-yl]-propionic acid, 3-[4-(4'-dimethylaminophenyl)-5-(4'-methylsulfinyl-
  phenyl)-oxazol-2-yl]-propionic acid,
2-[4-(4'-methylsulfinylphenyl)-5-(4'-dimethylamino-
  phenyl)-oxazol-2-yl]-propionic acid,
2-[4-(4'-dimethylaminophenyl)-5-(4'-methylsulfinyl-
  phenyl)-oxazol-2-yl]-propionic acid,
4-(4'-methylsulfinylphenyl)-5-(4'-dimethylamino-
  phenyl)-oxazol-2-yl]-acetic acid,
4-(4'-dimethylaminophenyl)-5-(4'-methylsulfinyl-
  phenyl)-oxazol-2-yl]-acetic acid,
3-[4-(4'-methylsulfinylphenyl)-5-(2'-fluorophenyl)-
  oxazol-2-yl]-acetic acid,
3-[4-(2'-fluorophenyl)-5-(4'-methylsulfinylphenyl)-
  oxazol-2-yl]-propionic acid,
2-[4-(4'-methylsulfinylphenyl)-5-(2'-fluorophenyl)-
  oxazol-2-yl]-propionic acid,
2-[4-(2'-fluorophenyl)-5-(4'-methylsulfinylphenyl)-
  oxazol-2-yl]-propionic acid,
4-(4'-methylsulfinylphenyl)-5-(2'-fluorophenyl)-
  oxazol-2-yl]-acetic acid,
4-(2'-fluorophenyl)-5-(4'-methylsulfinylphenyl)-
  oxazol-2-yl]-acetic acid,
3-[4-(4'-methylsulfinylphenyl)-5-(3'-methoxyphenyl)-
  oxazol-2-yl]-propionic acid,
3-[4-(3'-methoxyphenyl)-5-(4'-methylsulfinylphenyl)-
  oxazol-2-yl]-propionic acid,
2-[4-(4'-methylsulfinylphenyl)-5-(3'-methoxyphenyl)-
  oxazol-2-yl]-propionic acid,
2-[4-(3'-methoxyphenyl)-5-(4'-methylsulfinylphenyl)-
  oxazol-2-yl]-propionic acid,
4-(4'-methylsulfinylphenyl)-5-(3'-methoxyphenyl)-
  oxazol-2-yl]-acetic acid,
4-(3'-methoxyphenyl)-5-(4'-methylsulfinylphenyl)-
  oxazol-2-yl]-acetic acid,
3-[4-(3'-methylsulfinylphenyl)-5-(4'-chlorophenyl)-
  oxazol-2-yl]-propionic acid,
3-[4-(4'-chlorophenyl)-5-(3'-methylsulfinylphenyl)-
  oxazol-2-yl]-propionic acid,
2-[4-(3'-methylsulfinylphenyl)-5-(4'-chlorophenyl)-
  oxazol-2-yl]-propionic acid,
2-[4-(4'-chlorophenyl)-5-(3'-methylsulfinylphenyl)-
  oxazol-2-yl]-propionic acid,
4-(3'-methylsulfinylphenyl)-5-(4'-chlorophenyl)-
  oxazol-2-yl]-acetic acid,
4-(4'-chlorophenyl)-5-(3'-methylsulfinylphenyl)-
  oxazol-2-yl]-acetic acid,
3-[4-(4'-methylsulfinylphenyl)-5-(4'-methylphenyl)-
  oxazol-2-yl]-propionic acid,
3-[4-(4'-methylphenyl)-5-(4'-methylsulfinylphenyl)-
  oxazol-2-yl]-propionic acid,
2-[4-(4'-methylsulfinylphenyl)-5-(4'-methylphenyl)-
  oxazol-2-yl]-propionic acid,
2-[4-(4'-methylphenyl)-5-(4'-methylsulfinylphenyl)-
  oxazol-2-yl]-propionic acid,
4-(4'-methylsulfinylphenyl)-5-(4'-methylphenyl)-
  oxazol-2-yl]-acetic acid,
4-(4'-methylphenyl)-5-(4'-methylsulfinylphenyl)-
  oxazol-2-yl]-acetic acid,
3-[4-(4'-methylsulfinylphenyl)-5-(3'-trifluoromethyl-
  phenyl)-oxazol-2-yl]-propionic acid,
3-[5-(4'-methylsulfinylphenyl)-4-(3'-trifluoromethyl-
  phenyl)-oxazol-2-yl]-propionic acid,
3-[4-(4'-methylsulfinylphenyl)-5-phenyloxazole-2-yl]-
  propionic acid,
3-[5-(4'-methylsulfinylphenyl)-4-phenyloxazole-2-yl]-
  propionic acid,
3-[4-(4'-methylsulfinylphenyl)-5-(3'-hydroxyphenyl)-
  oxazol-2-yl]-propionic acid,
3-[4-(3'-chloro-4'-methylsulfinylphenyl)-5-(4'-
  chlorophenyl)-oxazol-2-yl]-propionic acid,
3-[4-(4-chlorophenyl)-2-(4-methylsulfinylphenyl)-
  oxazol-5-yl]-propionic acid,
3-[4-(2-fluorophenyl)-2-(4-methylsulfinylphenyl)-
  oxazol-5-yl]-propionic acid,
3-[4-(4-chlorophenyl)-2-(3-methylsulfinylphenyl)-
  oxazol-5-yl]-propionic acid,
2-[4-(4-chlorophenyl)-2-(4-methylsulfinylphenyl)-
  oxazol-5-yl]-propionic acid,
3-[2-(4-chlorophenyl)-4-(4-methylsulfinylphenyl)-
  oxazol-5-yl]-propionic acid,
2-(4-chlorophenyl)-4-(4-methylsulfinylphenyl)-
  oxazol-5-yl-acetic acid,
3-[4-(4-dimethylaminophenyl)-2-(4-methylsulfinyl-
  phenyl)-oxazol-5-yl]-propionic acid,
3-[5-(4-chlorophenyl)-2-(4-methylsulfinylphenyl)-
  oxazol-4-yl]-propionic acid,
3-[5-(2-fluorophenyl)-2-(4-methylsulfinylphenyl)-
  oxazol-4-yl]-propionic acid,
3-[5-(4-chlorophenyl)-2-(3-methylsulfinylphenyl)-
  oxazol-4-yl]-propionic acid,
2-[5-(4-chlorophenyl)-2-(4-methylsulfinylphenyl)-
  oxazol-4-yl]-propionic acid,
3-[2-(4-chlorophenyl)-5-(4-methylsulfinylphenyl)-
  oxazol-4-yl]-propionic acid,
2-(4-chlorophenyl)-5-(4-methylsulfinylphenyl)oxazol-
  4-ylacetic acid,
3-[5-(4-dimethylaminophenyl)-2-(4-methylsulfinyl-
  hpneyl)-oxazol-4-yl]-propionic acid,
2-(4-chlorophenyl)-5-(4-methylsulfinylphenyl)-thiazol-
  4-ylacetic acid,
2-(2-fluorophenyl)-5-(4-methylsulfinylphenyl)-thiazol-
  4-ylacetic acid,
5-(4-chlorophenyl)-2-(3-methylsulfinylphenyl)-thiazol-
  4-ylacetic acid,
2-[2-(4-chlorophenyl)-5-(4-methylsulfinylphenyl)-
  thiazol-4-yl]-propionic acid,
2-(4-dimethylaminophenyl)-5-(4-methylsulfinylphenyl)-
  thiazol-4-ylacetic acid,
4-(4-chlorophenyl)-5-(4-methylsulfinylphenyl)-thiazol-2-
  ylacetic acid,
4-(2-fluorophenyl)-5-(4-methylsulfinylphenyl)-thiazol-2-
  ylacetic acid,
4-(4-chlorophenyl)-5-(3-methylsulfinylphenyl)-thiazol-
  2-ylacetic acid,
2-[5-(4-chlorophenyl)-4-(4-methylsulfinylphenyl)-
  thiazol-2-yl]-propionic acid,
4-(4-dimethylaminophenyl)-5-(4-methylsulfinylphenyl)-
  thiazol-2-ylacetic acid.

The novel alkylsulfinyl derivatives of the invention may be prepared from compounds known in the literature or from materials readily prepared via known literature procedures. For example, the alkylsulfinyl derivatives may be readily prepared from the corresponding alkylthio materials via oxidation techniques. The alkylthio starting materials are known in the art and procedures for their preparation may be found in the literature (e.g., J. Med. Chem., 13, 203 (1970), Harrison, et al.; Netherlands Pat. 6800880; Netherlands Pat. 6715532; British Pat. 1,145,884; and Brit. J. Pharma. (1971), 42, (4), 638–639). For example, oxidation of the known 2-(6-methylthio-2-naphthyl)-propionic acid yields the desired 2-(6-methylsulfinyl-2-naphthyl)-propionic acid.

Oxidation of the alkylthio moiety to the alkylsulfinyl derivatives may proceed by either oxidation as the final step of the reaction or alternatively the sequence may involve oxidation of an intermediate alkylthio compound to the alkylsulfinyl moiety before ring closure, followed by ring closure (hydrolysis, etc.) to the desired alkylsulfinyl moiety. Several methods are available for oxidation of alkylthio groups to alkylsulfinyl groups. For example, sodium metaperiodate, hydrogen peroxide, 1,4-diazobicyclo [2.2.2] octane-bromine in acetic acid, iodobenzene dichloride, or dimethylsulfoxide may be employed in the practice of the invention.

Representative methods for the preparation of the compounds of the invention are set forth in the following examples.

EXAMPLE 1

2-(6-methylsulfinyl-2-naphthyl)-propionic acid

To a cooled soltuion of 2-(6-methylthio-2-naphthyl)-propionic acid (2.46 g., 0.01 m.) in methanol-acetone is added a solution of sodium metaperiodate (4.3 g., 0.02 m.) in a minimum amount of water, and the mixture allowed to warm to room temperature and stirred until precipitation of the sodium iodate is complete. The mixture is filtered, diluted with an equal volume of water, and the methanol-acetone blown off with a stream of nitrogen. The solid material is filtered, washed with water and dried to give 2-(6-methylsulfinyl-2-naphthyl)-propionic acid.

When the 2-(6-methylthio-2-naphthyl)-propionic acid starting material in the above example is replaced by other alkylthio compounds, e.g., 2-(5-methyl-2-naphthyl)-propionic acid,
2-(7-methylthio-2-naphthyl)-propionic acid,
2-(8-methylthio-2-naphthyl)-propionic acid,
2-(3-methylthio-2-naphthyl)-propionic acid,
2-[6-(difluoromethylthio)-2-naphthyl]-propionic acid,
6-methylthio-2-naphthylacetic acid,
2-(3-fluoro-6-methylthio-2-naphthyl)-propionic acid,
2-(3-methoxy-6-methylthio-2-naphthyl)-propionic acid, or
2-(4-chloro-6-methylthio-2-naphthyl)-propionic acid, the corresponding alkylsulfinyl compound is obtained:

2-(5-methylsulfinyl-2-naphthyl)-propionic acid,
2-(7-methylsulfinyl-2-naphthyl)-propionic acid,
2-(8-methylsulfinyl-2-naphthyl)-propionic acid,
2-(3-methylsulfinyl-2-naphthyl)-propionic acid,
2-[6-(difluoromethylsulfinyl)-2-naphthyl]-propionic acid,
2-(3-fluoro-6-methylsulfinyl-2-naphthyl)-propionic acid,
2-(3-methoxy-6-methylsulfinyl-2-naphthyl)-propionic acid, or
2-(4-chloro-6-methylsulfinyl-2-naphthyl)-propionic acid.

EXAMPLE 2

3-(4-methylsulfinylbenzoyl)-phenylacetic acid

When 3 - [(4 - methylthio)benzoyl]-phenylacetic acid (2.62 g., 0.01 m.) is used in place of 2-(6-methylthio-2-naphthyl)-propionic acid in the procedure of Example 1 3-(4-methylsulfinylbenzoyl)-phenylacetic acid is obtained.

When the 3-[(4-methylthio)-benzoyl]-phenylacetic acid in the above example is replaced by other alkylthio-benzoylphenylacetic acids, e.g., 2-methoxy-3-[(4-methylthio)benzoyl]-phenylacetic acid,
4-chloro-3-[(4-methylthio)benzoyl]-phenylacetic acid,
2-[3-[(4-methylthio)benzoyl]-phenyl]-propionic acid,
5-chloro-3-[(4-methylthio)-benzoyl]-phenylacetic acid, or
2-fluoro-3-[(4-methylthio)-benzoyl]-phenylacetic acid, the corresponding alkylsulfinyl compound is obtained:

2-methoxy-3-[(4-methylsulfinyl)benzoyl]-phenylacetic acid,
4-chloro-3-[(4-methylsulfinyl)benzoyl]-phenylacetic acid,
2-[3-[(4-methylsulfinyl)benzoyl]-phenyl]-propionic acid,
5-chloro-3-[(4-methylsulfinyl)-benzoyl]-phenylacetic acid, or
2-fluoro-3-[(4-methylsulfinyl)-benzoyl]-phenylacetic acid.

EXAMPLE 3

2-(4'-chlorophenyl)-4-(4'-methylsulfinylphenyl)-thiazol-5-ylacetic acid

When 2-(4'-chlorophenyl)-4 - (4' - methylthiophenyl)-thiazol-5-ylacetic acid (0.01 m.) is used in place of 2-(6-methylthio-2-naphthyl)-propionic acid in the procedure of Example 1, 2-(4'-chlorophenyl)-4-(4' - methylsulfinylphenyl)-thiazol-5-ylacetic acid is obtained.

When the 2-(4'-chlorophenyl)-4-(4'-methylthiophenyl)-thiazol-5-ylacetic acid in the above example is replaced by other alkylsulfinylphenylthiazolyl and oxazolyl acetic and propionic acids, e.g., 2-[2-(4'-chlorophenyl)-4-(4'-methylthiophenyl)thiazol-5-yl]-propionic acid,
2-(4'-methylthiophenyl)-4-(4'-chlorophenyl)-thiazol-5-ylacetic acid,
3-[4-(4'-methylthiophenyl)-5-(4'-chlorophenyl)-oxazol-2-yl]-propionic acid, or
2-(4'-methylthiophenyl)-4-(4'-fluorophenyl)-thiazol-5-ylacetic acid, the corresponding alkylsulfinyl compound is obtained:

2-[2-(4'-chlorophenyl)-4-(4'-methylsulfinylphenyl)-thiazol-5-yl]-propionic acid,
2-(4'-methylsulfinylphenyl)-4-(4'-chlorophenyl)-thiazol-5-ylacetic acid,
3-[4-(4'-methylsulfinylphenyl)-5-(4'-chlorophenyl)-oxazol-2-yl]-propionic acid, or
2-(4'-methylsufilnylphenyl)-4-(4'-fluorophenyl)-thiazol-5-ylacetic acid.

EXAMPLE 4

When the following alkylthio moieties are used in place of the alkylthio derivative in the procedure of Example 1, the corresponding alkylsulfinyl compounds are obtained. For example, oxidation of the following methylthio materials:

3-[5-(4-chlorophenyl)-2-(4-methylthiophenyl)-oxazol-4-yl]-propionic acid,
3-[5-(2-fluorophenyl)-2-(4-methylthiophenyl)-oxazol-4-yl]-propionic acid,
3-[5-(4-chlorophenyl)-2-(3-methylthiophenyl)-oxazol-4-yl]-propionic acid,
2-[5-(4-chlorophenyl)-2-(4-methylthiophenyl)-oxazol-4-yl]-propionic acid,
3-[2-(4-chlorophenyl)-5-(4-methylthiophenyl)-oxazol-4-yl]-propionic acid,
2-(4-chlorophenyl)-5-(4-methylthiophenyl)-oxazol-4-ylacetic acid,
3-[5-(4-dimethylaminophenyl)-2-(4-methylthiophenyl)-oxazol-4-yl]-propionic acid,
2-(4-chlorophenyl)-5-(4-methylthiophenyl)-thiazol-4-ylacetic acid,
2-(2-fluorophenyl)-5-(4-methylthiophenyl)-thiazol-4-ylacetic acid, z
5-(4-chlorophenyl)-2-(3-methylthiophenyl)-thiazol-4-ylacetic acid,
2-[2-(4-chlorophenyl)-5-(4-methylthiophenyl)-thiazol-4-yl]-propionic acid,
2-(4-dimethylaminophenyl)-5-(4-methylthiophenyl)-thiazol-4-ylacetic acid,
4-(4-chlorophenyl)-5-(4-methylthiophenyl)-thiazol-2-ylacetic acid,
4-(2-fluorophenyl)-5-(4-methylthiophenyl)-thiazol-2-ylacetic acid,
4-(4-chlorophenyl)-5-(3-methylthiophenyl)-thiazol-2-ylacetic acid,
2-[5-(4-chlorophenyl)-4-(4-methylthiophenyl)-thiazol-2-yl]-propionic acid,
4-(4-dimethylaminophenyl)-5-(4-methylthiophenyl)-thiazol-2-ylacetic acid,
3-[4-(4-chlorophenyl)-2-(4-methylthiophenyl)-oxazol-5-yl]-propionic acid,
3-[4-(2-fluorophenyl)-2-(4-methylthiophenyl)-oxazol-5-yl]-propionic acid,
3-[4-(4-chlorophenyl)-2-(3-methylthiophenyl)-oxazol-5-yl]-propionic acid,
2-[4-(4-chlorophenyl)-2-(4-methylthiophenyl)-oxazol-5-yl]-propionic acid, 3-[2-(4-chlorophenyl)-4-(4-methylthiophenyl)-oxazol-5-yl]-propionic acid,
2-(4-chlorophenyl)-4-(4-methylthiophenyl)-oxazol-5-ylacetic acid, or
3-[4-(4-dimethylaminophenyl)-2-(4-methylthiophenyl)-oxazol-5-yl]-propionic acid, results in the preparation of the following methylsulfinyl moieties:

3-[5-(4-chlorophenyl)-2-(4-methylsulfinylphenyl)-oxazol-4-yl]-propionic acid,
3-[5-(2-fluorophenyl)-2-(4-methylsulfinylphenyl)-oxazol-4-yl]-propionic acid,
3-[5-(4-chlorophenyl)-2-(3-methylsulfinylphenyl)-oxazol-4-yl]-propionic acid,
2-[5-(4-chlorophenyl)-2-(4-methylsulfinylphenyl)-oxazol-4-yl]-propionic acid,
3-[2-(4-chlorophenyl)-5-(4-methylsulfinylphenyl)-oxazol-4-yl]-propionic acid,
2-(4-chlorophenyl)-5-(4-methylsulfinylphenyl)-oxazol-4-ylacetic acid,
3-[5-(4-dimethylaminophenyl)-2-(4-methylsulfinylphenyl)-oxazol-4-yl]-propionic acid,
2-(4-chlorophenyl)-5-(4-methylsulfinylphenyl)-thiazol-4-ylacetic acid,
2-(2-fluorophenyl)-5-(4-methylsulfinylphenyl)-thiazol-4-ylacetic acid,
5-(4-chlorophenyl)-2-(3-methylsulfinylphenyl)-thiazol-4-ylacetic acid,
2-[2-(4-chlorophenyl)-5-(4-methylsulfinylphenyl)-thiazol-4-yl]-propionic acid,
2-(4-dimethylaminophenyl)-5-(4-methylsulfinylphenyl)-thiazol-4-ylacetic acid,
4-(4-chlorophenyl)-5-(4-methylsulfinylphenyl)-thiazol-2-ylacetic acid,
4-(2-fluorophenyl)-5-(4-methylsulfinylphenyl)-thiazol-2-ylacetic acid,
4-(4-chlorophenyl)-5-(3-methylsulfinylphenyl)-thiazol-ylacetic acid,
2-[5-(4-chlorophenyl)-4-(4-methylsulfinylphenyl)-thiazol-2-yl]-propionic acid,
4-(4-dimethylaminophenyl)-5-(4-methylsulfinylphenyl)-thiazol-2-ylacetic acid,
3-[4-(4-chlorophenyl)-2-(4-methylsulfinylphenyl)-oxazol-5-yl]-propionic acid,
3-[4-(2-fluorophenyl)-2-(4-methylsulfinylphenyl)-oxazol-5-yl]-propionic acid,
3-[4-(4-chlorophenyl)-2-(3-methylsulfinylphenyl)-oxazol-5-yl]-propionic acid,
2-[4-(4-chlorophenyl)-2-(4-methylsulfinylphenyl)-oxazol-5-yl]-propionic acid,
3-[2-(4-chlorophenyl)-4-(4-methylsulfinylphenyl)-oxazol-5-yl]-propionic acid,
2-(4-chlorophenyl)-4-(4-methylsulfinylphenyl)-oxazol-5-ylacetic acid,
3-[4-(4-dimethylaminophenyl)-2-(4-methylsulfinylphenyl)-oxazol-5-yl]-propionic acid.

The pharmaceutically acceptable addition salts can be prepared from the acid by any of the well known methathesis procedures. For example, the acid can be reacted with an inorganic base such as sodium hydroxide, potassium hydroxide, ammonium hydroxide, barium hydroxide, and the like.

The compounds of this invention, wherein $R_2$ is a group such that an ester is the final compound (i.e., $R_2$=alkoxy), are prepared by any esterification procedure using an esterifying agent containing the appropriate $R_2$ group. For example, the acetic acid compouds of this invention may be reacted with the appropriate lower alkanol (preferably methanol) in the presence of a strong acid, such as hydrochloric acid, sulfuric acid, p-toluenesulfonic acid, and the like, to form the desired $R_2$ compound. The methyl ester ($R_2$=methoxy) can also be prepared by the treatment of the acid with diazomethane.

The compounds of this invention, wherein $R_2$ is a group such that an amide is the final compound (i.e., $R_2$ amino), may be prepared by any suitable amidation reaction. For example, the acetic acid compound (preferably the methyl or ethyl ester) may be reacted with ammonia, ammonium hydroxide, or an amine compound, at any suitable temperature (room temperature to reflux). When the amino group is desired, it is preferred to carry out the reaction with ammonia in a bomb at temperatures above 100° C. to form the desired $R_2$ (amino) compound. Preferably, when an amide is desired which is derived from an amino acid, the following reaction sequence is followed: The acetic acid final compound is reacted with isobutyl chlorocarbonate to form the mixed anhydride. This compound is in turn reacted with the desired amino acid ester and subsequently hydrolyzed to form the desired amide.

Since the $\alpha$-methyl acetic acid compounds of this invention possess asymmetric carbon atoms, they are ordinarily present in the form of a racemic mixture. The resolution of such racemates can be carried out by a number of known methods. Thus, some racemic mixtures can be precipitated as eutectics instead of mixed crystals and can thus be quickly separated and in such cases can sometimes be selectively precipitated. The more common method of chemical resolution may be used. By this method diastereomers are formed from the racemic mixture by reaction with an optically-active resolving agent. Thus, an optically-active base can be reacted with the carboxy group. The difference insolubility between the diastereomers formed permits the selective crystallization of one form and regeneration of the optically-active acid from the mixture. There is, however, a third method of resolving which shows great promise. This involves biochemical procedures using selective enzymatic reaction. Thus, the racemic acid can be subjected to an asymmetric oxidase or decarboxylase which will, by oxidation or decarboxylation, destroy one form leaving the other form unchanged. Of interest is the use of a hydrolysase on a derivative of the racemic mixture to form preferentially one form of the acid. Thus, esters or amides of the acids can be subjected to an esterase which will selectively saponify one enantiomorph and leave the other unchanged.

Furthermore, it should be noted that the above resolution methods may be employed at any stage of the synthesis upon such intermediates that have an asymmetric carbon atoms. For example, the (d) isomer of the free acid of Example 1 may be prepared by any one of the preceding described resolving methods, preferably working from the free acid as the starting material. For example, amide or salt diastereomers of the free acid may be formed with optically-active amines, such as quinine, brucine, cinchonidine, cinchonine, hydroxyhydrindamine, methylamine, morphine, $\alpha$-phenylethylamine, phenyloxynaphthylmethylamine, quinidine, 1-fenchylamine, strychnine, basic amino acids, such as lysine, arginine, amino acid esters, and the like. Similarly, ester diastereomers of the free acid may be formed with optically-active alcohols, such as borneol, menthol, 2-octanol and the like. Especially preferred is the use of cinchonidine to give the readily decomposable diastereomer salt which may then be resolved by dissolving in a solvent, and distilling the solvent at atmospheric pressure until crystals being to appear and further crystallization produced by allowing the mixture to cool to room temperature, thereby separating the two enantiomorphs. The (d) acid may then be recovered from the (d) salt by extracting the salt between an inroganic and organic solvent.

In summary, resolution of the acid into the "d" and "l" forms may be accomplished using techniques well known to the art. See for example "Stereochemistry of Carbon Compounds," E. L. Eliel, McGraw-Hill (1962), pages 47–85, which reveals methods of resolution which may be used in the practice of the invention and are incorporated herein by reference. Illustrative of such methods are the following:

(a) Resolution by mechanical separation of crystals.
(b) Resolution by formation of diastereoisomers.
(c) Resolution by equilibrium asymmetric transformation.
(d) Resolution by kinetic asymmetric transformation.
(e) Biochemical asymmetric transformation.
(f) Absolute asymmetric synthesis.
(g) Asymmetric synthesis involving symmetric compounds.

The alkylsulfinyl derivatives of the invention possess a high degree of anti-inflammatory, analgesic and antipyretic activity. They are of value in the treatment of arthritic and dermatological dissorders or like conditions responsive to to anti-inflammatory drugs. In general they are indicated for a wide variety of conditions where one or more of the symptoms, of inflammation, fever and pain are manifested. Included within this category are diseases such as rheumatoid arthritis, osteo arthritis, gout, infectious arthritis and rheumatic fever. As indicated above the compounds utilized in the practice of the invention also possess a useful degree of analgesic and antipyretic activity.

For these purposes the compounds of the invention may be administered orally, topically, parenterally, by inhalation spray or rectally in dosage unit formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with nontoxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate above or with a wax may be employed.

Formulations for oral use may also be presented as hard gelatine capsules wherein the active ingredient is mixed with an inert solid diluent, for example, calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl, or n-propyl, p-hydroxy benzoate, one or more coloring agents, one or more flavoring agents, and one or more sweetening agents, such as sucrose or saccharin.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a nontoxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

The compounds of the invention may also be administered in the form of suppositories for rectal administration of the drug. These compositions can be prepared by mixing the drug with a suitable nonirritating excipient which is solid at ordinary temperatures but liquid at the rectal temperature and will therefore melt in the rectum to rerelease the drug. Such materials are cocoa butter and polyethylene glycols.

For topical use, creams, ointments, jellies, solutions or suspensions, etc. containing the anti-inflammatory agents are employed.

Dosage levels of the order of 20 mg. to 7 grams per day are useful in the treatment of the above indicated conditions. For example, inflammation is effectively treated and antipyretic and analgesic activity manifested by the administration from about .3 to 100 milligrams of the compound per kilogram of body weight per day. Advantageously from about 1 mg. to about 50 mg. per kilogram of body weight and especially from about 2 mg. to about 20 mg./kg. per daily dosage produce highly effective results.

The amount of active ingredient that may be combined with the carrier materials to produce a single dosage form will vary depending upon the host treated and the particular mode of administration. For example a formulation intended for the oral administration of humans may contain from 5 mg. to 5 grams of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The following are illustrative of the techniques that may be employed in the preparation of pharmaceutical formulations to be utilized in the practice of the invention:

EXAMPLE 5

A mixture of 250 parts of 2-(6-methylsulfinyl-2-naphthyl)-propionic acid and 25 parts of lactose is granulated with suitable water, and to this is added 100 parts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

The 2 - (6-methylsulfinyl-2-naphthyl) - propionic acid used in the foregoing example may be replaced by 25, 100, 250, or 500 parts of other alkylsulfinyl derivatives of this invention to produce tablets suitable for oral administration as an anti-inflammatory, antipyretic and/or analgesic according to the method of this invention.

EXAMPLE 6

A mixture of 50 parts of 3-(4-methylsulfinyl-benzoyl)-phenylacetic acid, 3 parts of the calcium salt of lignin sulphonic acid, and 237 parts of water is ball-milled until the size of substantially all of the particles of the methylsulfinyl material is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 7

A mixture of 250 parts of 2-(4'-chlorophenyl)-4-(4'-methylsulfinylphenyl)-thiazol-5-ylacetic acid, 200 parts of maize starch and 30 parts of alginic acid is mixed with a sufficient quantity of 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 8

A mixture of 500 parts 6-methylsulfinyl-2-naphthyl)-acetic acid, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 9

(1) Tablets.—10,000 scored tablets for oral use, each containing 500 mg. of methyl sulfinyl material, are prepared from the following ingredients:

| | Gm. |
|---|---|
| 2 - [3 - [(4-methylsulfinyl)-benzoyl]-phenyl]-propionic acid | 5000 |
| Starch, U.S.P. | 350 |
| Talc, U.S.P. | 250 |
| Calcium stearate | 35 |

The powdered methylsulfinyl material is granulated with a 4% w./v. aqueous solution of methylcellulose U.S.P. (1500 cps.). To the dried granules is added a mixture of the remainder of the ingredients and the final mixture compressed into tablets of proper weight.

(2) Capsules.—10,000 two-piece hard gelatine capsules for oral use, each containing 250 mg. of 2-(7-methylsulfinyl-2-naphthyl)-propionic acid are prepared from the following ingredients:

| | Gm. |
|---|---|
| Methylsulfinyl material | 2500 |
| Lactose, U.S.P. | 1000 |
| Starch, U.S.P. | 300 |
| Talc, U.S.P. | 65 |
| Calcium stearate | 25 |

The powdered methylsulfinyl material is mixed with the starch-lactose mixture followed by the talc and calcium stearate. The final mixture is then encapsulated in the usual manner. Capsules containing 10, 25, 50, and 100 mg. of methylsulfinyl material are also prepared by substituting 100, 250, 500 and 1000 gm. for 2500 gm. in the above formulation.

(3) Soft elastic capsules.—One-piece soft elastic capsules for oral use, each containing 200 mg. of methylsulpnyl material are prepared in the usual manner by first dispersing the powdered active material in sufficient corn oil to render the material capsulatable.

(4) Aqueous suspension.—An aqueous suspension for oral use containing in each 5 ml., 1 gram of methylsulfinyl material is prepared from the following ingredients:

| | | |
|---|---|---|
| 2 - [3 - [(3-methylsulfinyl)-benzoyl]-phenyl]-propionic acid | gm | 2000 |
| Methylparaben, U.S.P. | gm | 7.5 |
| Propylparaben, U.S.P. | gm | 2.5 |
| Saccharin sodium | gm | 12.5 |
| Glycerin | ml | 3000 |
| Tragacanth powder | gm | 10 |
| Orange oil flavor | gm | 10 |
| F. D. and C. orange dye | gm | 7.5 |
| Deionized water, q.s. to 10,000 mg. | | |

What is claimed is:

1. A method of treating a condition exhibiting at least one of the symptoms of pain, fever and inflammation which comprises the administration to a human or animal of a therapeutically effective amount of a compound of the formula:

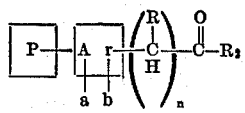

and pharmaceutically acceptable addition salt, wherein:
R is H or lower alkyl;
$R_2$ is hydroxy, amino, lower alkoxy, lower alkylamino;
n is the integer one or two;

is

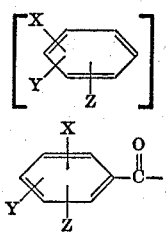

or

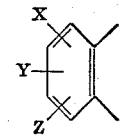

wherein:
X is H or loweralkylsulfinyl;
Y is H, halogen, loweralkylthio, loweralkylsulfinyl, loweralkylsulfonyl, cyano, OH, loweralkoxy, loweralkyl, amino, loweralkylamino, diloweralkylamino, haloloweralkylsulfinyl or loweralkyloxyloweralkylsulfinyl;
Z is H, halogen, loweralkoxy, amino, loweralkylamino or diloweralkylamino;

is phenyl;
a is H or loweralkylsulfinyl;
b is H, OH, lower alkoxy, diloweralkylamino, loweralkylsulfinyl or halogen
wherein at least one of X or a must be loweralkylsulfinyl.

2. The method of claim 1 wherein the compound is selected from the group consisting of:

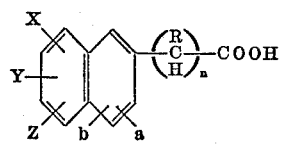

and

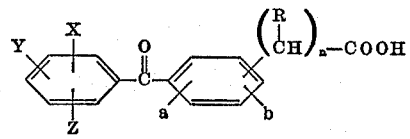

and pharmaceutically acceptable addition salts.

3. The method of claim 2 wherein the compound is:

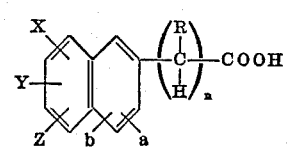

4. The method of claim 2 wherein the compound is:

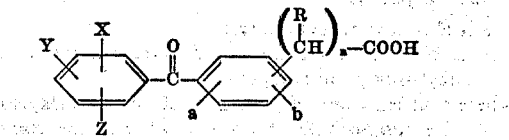

5. A method of treating a condition exhibiting at least one of the symptoms of pain, fever and inflammation which comprises the administration to human or animal of a therapeutically effecting amount of a compound selected from the group consisting of 2-(6-methylsulfinyl-2-naphthyl)-propionic acid,
2-(3-methylsulfinyl-2-naphthyl)-propionic acid,
2-(4-methylsulfinyl-2-naphthyl)-propionic acid,
2-(7-methylsulfinyl-2-naphthyl)-propionic acid,
2-(4-fluoro-6-methylsulfinyl-2-naphthyl)-propionic acid,
2-(7-fluoro-6-methylsulfinyl-2-naphthyl)-propionic acid,
3-[(4-methylsulfinyl)-benzoyl]-phenylacetic acid,
2-[3-([(4-methylsulfinyl)-benzoyl]-phenyl]-propionic acid,
2-[3-[(2-chloro-4-methylsulfinyl)benzoyl]-propionic acid,
2-[4-fluoro-3-[(4-methylsulfinyl)-benzoyl]phenyl]-propionic acid and
4-chloro-3-[(4-methylsulfinyl)-benzoyl]-phenylacetic acid.

6. The method of claim 5 wherein the compound is 2-(6-methylsulfinyl-2-naphthyl)-propionic acid.

7. The method of claim 5 wherein the compound is 3-[(4-methylsulfinyl)-benzoyl]-phenylacetic acid.

8. A pharmaceutical composition comprising a pharmaceutical carrier and an anti-inflammatory, antipyretic and analgesic effective nontoxic amount of a compound of the formula:

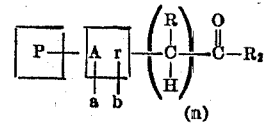

and pharmaceutically acceptable addition salt, wherein:
R is H or lower alkyl;
$R_2$ is hydroxy, amino, lower alkoxy, lower alkylamino;
n is the integer one or two;

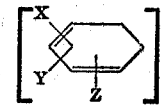 is

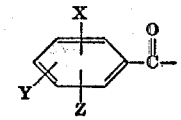

or

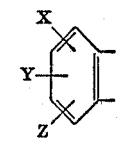

wherein:
X is H or loweralkylsulfinyl;
Y is H, halogen, loweralkylthio, loweralkylsulfinyl, loweralkyl, cyano, OH, loweralkoxy, loweralkyl, aminoloweralkylamino, diloweralkylamino, haloloweralkylsulfinyl or loweralkyloxyloweralkylsulfinyl;

Z is H, halogen loweralkoxy, amino, loweralkylamino or diloweralkylamino;

Ar is phenyl;

a is H or loweralkylsulfinyl;

b is H, OH, lower alkoxy, diloweralkylamino, loweralkylsulfinyl or halogen;

wherein at least one of X or a must be loweralkylsulfinyl.

9. The composition of claim 8 wheerin the compound is selected from the group consisting of:

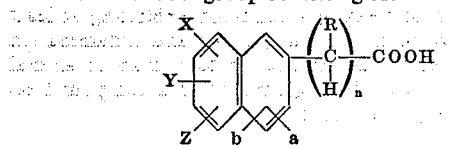

and

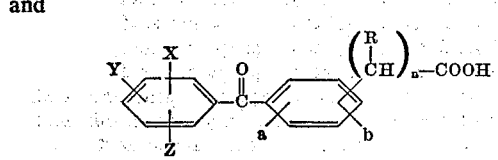

and pharmaceutically acceptable addition salt.

10. The composition of claim 8 wherein the compound is of the formula:

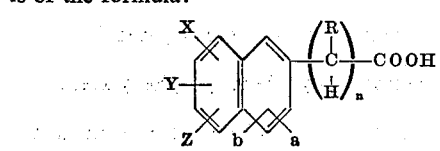

11. The composition of claim 9 wherein the compound is of the formula:

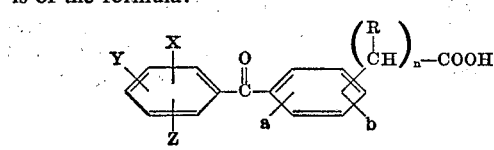

12. A pharmaceutical composition comprising a pharmaceutical carrier and an anti-inflammatory, antipyretic and analgesic effective nontoxic amount of a compound selected from the group consisting of 2-(6-methylsulfinyl-2-naphthyl)-propionic acid,
2-(3-methylsulfinyl-2-naphthyl)-propionic acid,
2-(4-methylsulfinyl-2-naphthyl)-propionic acid,
2-(7-methylsulfinyl-2-naphthyl)-propionic acid,
2-(4-fluoro-6-methylsulfinyl-2-naphthyl)-propionic acid,
2-(7-fluoro-6-methylsulfinyl-2-naphthyl)-propionic acid,
3-[(4-methylsulfinyl)-benzoyl]-phenylacetic acid,
2-[3-[(4-methylsulfinyl)-benzoyl]-phenyl]-propionic acid,
2-[3-[(2-chloro-4-methylsulfinyl)benzoyl]-phenyl]-propionic acid,
2-[4-fluoro-3-[(4-methylsulfinyl)benzoyl]-phenyl]-propionic acid and
4-chloro-3-[(4-methylsulfinyl)-benzoyl]-phenylacetic acid.

13. The composition of claim 12 wherein the compound is 2-(6-methylsulfinyl-2-naphthyl)-propionic acid.

14. The composition of claim 12 wherein the compound is 3-[(4-methylsulfinyl) - benzoyl]-phenylacetic acid.

References Cited
FOREIGN PATENTS
6,800,880   7/1968   Netherlands _____ 0—18

OTHER REFERENCES
Harrison et al., J. Med. Chem., March 1970, pp. 203–205.

STANLEY J. FRIEDMAN, Primary Examiner

U.S. Cl. X.R.

260—247.1, 293.73, 302 R, 307 R, 326.82, 470, 515, 518, 519, 558, 559

UNITED STATES PATENT OFFICE
CERTIFICATE OF CORRECTION

Patent No. 3,792,170  Dated February 12, 1974

Inventor(s) T. Y. Shen and B. E. Witzel

It is certified that error appears in the above-identified patent and that said Letters Patent are hereby corrected as shown below:

In Column 17, lines 15-20, the formula appearing within the brackets should be deleted.

In Column 18, lines 50-55, the formula appearing within the brackets should be deleted.

Signed and sealed this 11th day of June 1974.

(SEAL)
Attest:

EDWARD M. FLETCHER, JR.
Attesting Officer

C. MARSHALL DANN
Commissioner of Patents